United States Patent [19]
Matsuno et al.

[11] Patent Number: 5,949,761
[45] Date of Patent: *Sep. 7, 1999

[54] BUS MANAGEMENT APPARATUS

[75] Inventors: Katsumi Matsuno; Ichiro Kubota, both of Kanagawa; Minobu Hayashi, Tokyo; Hisato Shima, Chiba, all of Japan

[73] Assignee: Sony Corporation, Tokyo, Japan

[*] Notice: This patent is subject to a terminal disclaimer.

[21] Appl. No.: 08/884,752

[22] Filed: Jun. 30, 1997

Related U.S. Application Data

[62] Continuation of application No. 08/819,021, Mar. 17, 1997, which is a continuation of application No. 08/403,708, filed as application No. PCT/JP94/01188, Jul. 19, 1994, abandoned.

[30] Foreign Application Priority Data

Jul. 19, 1993 [JP] Japan .................................. 5-200055

[51] Int. Cl.⁶ ...................................................... H04J 3/16

[52] U.S. Cl. .......................... 370/254; 370/256; 370/443

[58] Field of Search ........................ 340/825.07, 825.04, 340/825.02, 825.5, 825.24, 825.25; 370/254, 256, 257, 431, 443, 458, 459, 468; 395/200.05

[56] References Cited

U.S. PATENT DOCUMENTS

| | | | |
|---|---|---|---|
| 3,851,104 | 11/1974 | Willard et al. | 370/442 |
| 4,763,319 | 8/1988 | Rozenblit | 370/397 |
| 4,763,321 | 8/1988 | Calvignac et al. | 370/326 |
| 4,980,886 | 12/1990 | Bernstein | 370/443 |
| 4,988,990 | 1/1991 | Warrior | 340/825.5 |
| 5,289,460 | 2/1994 | Drake, Jr. et al. | 370/245 |
| 5,394,556 | 2/1995 | Oprescu | 395/200.05 |

Primary Examiner—Edwin C. Holloway, III
Attorney, Agent, or Firm—Frommer Lawrence & Haug, LLP; William S. Frommer

[57] ABSTRACT

A bus management node 11 has a register for channels in use REG1 and a bus capacity register REG2. Before starting the synchronous communication, each node 12 transmits a read-out command to the register for channels in use REG1 and the register for channels in use REG1 in order to read out their contents for ascertaining the number of the un-used channel and the residual capacity If there is any un-used channel and any residual bus capacity, the node 12 transmits write commands to these registers REG1 and REG2 so that the number of the channel to be in use and the capacity of the bus to be in use will be stored in the register for channels in use REG1 and the bus capacity register REG2. This enables bus management to be achieved easily in a system performing synchronous communication between plural nodes connected to the bus.

25 Claims, 8 Drawing Sheets

FIG.1 bitN: SHOWS USE STATE OF CHANNEL N (1: IN USE, 0: NOT IN USE)

FIG.2(a)

HAS A VALUE INDICATING
RESIDUAL BUS QUANTITY

BUS MANAGEMENT APPARATUS

This application is a continuation of application Ser. No. 08/819,021, filed Mar. 17, 1997, which in turn was a continuation of application Ser. No. 08/403,708, filed as PCT/JP94/01188, filed on Jul. 19, 1994, now abandoned.

TECHNICAL FIELD

This invention relates to a bus management method in a communication system in which AV apparatus, such as a video tape recorder (VTR), a monitor or a tuner, are connected to a bus for exchanging digital video signals or digital audio signals.

BACKGROUND TECHNOLOGY

There has been entertained a communication system in which Av apparatus, such as a video tape recorder (VTR), a monitor or a tuner, are connected to a bus for exchanging digital video signals or digital audio signals.

Figure 8:
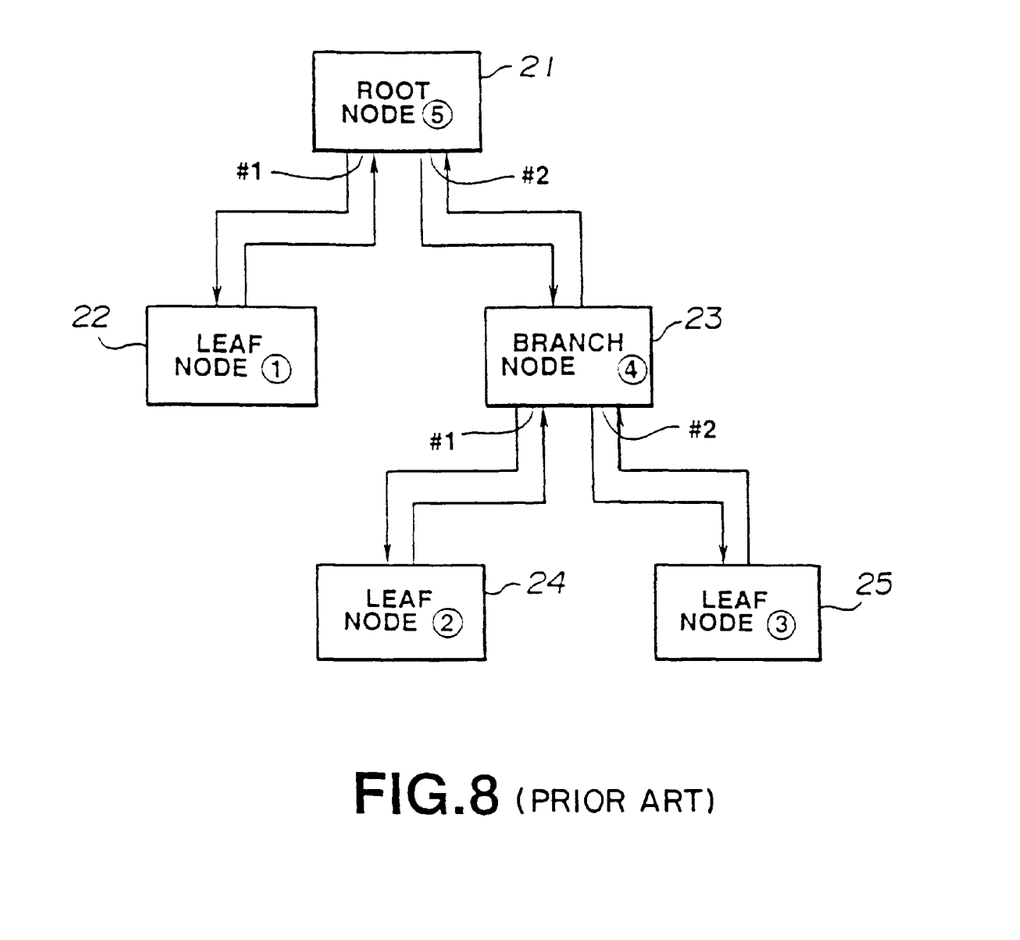
FIG. 8 shows an example of a communication system for synchronous communication between plural nodes connected to the bus.
Figure 9:
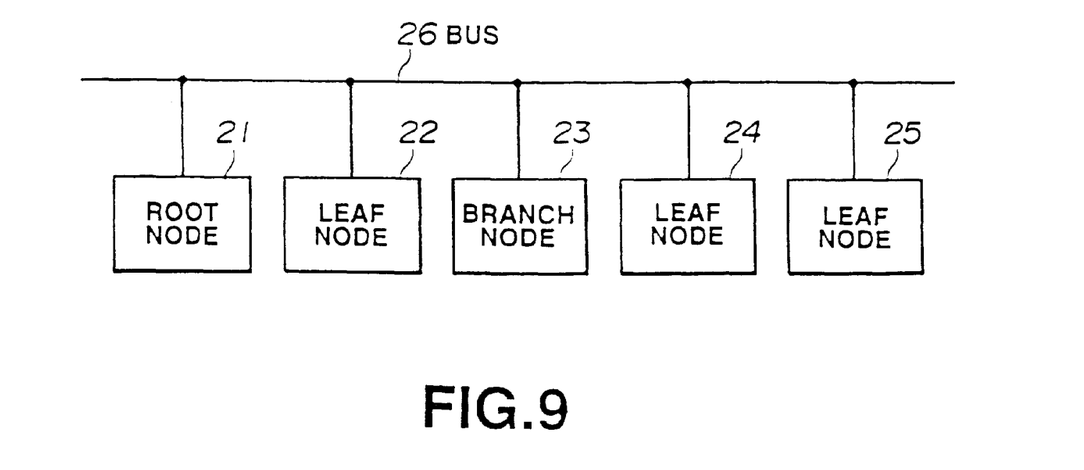
FIG. 9 is a block diagram equivalently stating the above communication system.

FIG. 8 shows an example of such communication system, which is provided with a root node 21, a leaf node 22, a branch node 23, a leaf node 24 and a leaf node 25. Input/output ports between the nodes 21 and 22, also referred to as nodes 21–22, hereinafter the same, the nodes 21–23, the nodes 23–24 and the nodes 23–25, are connected by two sets of twist pair cables. The nodes 21 to 25 are the digital VTRs, tuners or personal computers, as discussed above, each having one or more input/output ports. Each node 21 to 25 has an amplifier and a relay enclosed therein. The communication system shown in FIG. 8 is equivalent to a communication system in which the nodes 21 to 25 are connected to a bus 26.

The structure shown in FIG. 8 is a hierarchical structure in which the nodes 22 and 23 are connected in the lower layer relative to the node 21 and the nodes 24 and 25 are connected in the lower layer relative to the node 23. In other words, the node 21 is a master node for the nodes 22 and 23, while the node 23 is a master node for the nodes 24 and 25. The sequence for determining such hierarchical structure is now explained.

If the nodes 21–22, 21–23, 23–24 and 23–25 are connected by cables, the node only one input/output port of which is connected to an other node notifies the node to which it is connected that the latter node is the master node. In the case of FIG. 8, the nodes 24 and 25 notify the node 23 of the fact that the node 23 is the master node, while the node 22 notifies the node 21 of the fact that the node 21 is the master node.

The node plural input/output nodes of which are connected to other nodes notifies a node other than the node which has notified the firstly-stated node that the firstly-stated node is the master node that such other node is the master node. In the case of FIG. 8, the node 23 notifies the node 21 that the node 21 is the master node, while the node 21 notifies the node 23 that the node 23 is the master node. Since in such case the nodes 21, 23 notify each other that the counterpart node is the master node, the node which has made such notification first becomes the master node. FIG. 8 shows a case in which the node 21 has become the master node.

The sequence of according an address to each node is explained. Basically, the node address is accorded by the master node permitting an address to be accorded to a slave node. If there are plural slave nodes, addresses are accorded in the order of the smaller port numbers to which the slave nodes are connected.

In FIG. 8, in which the node 22 is connected to a port #1 of the node 21 and the node 23 is connected to a port #2 of the node 22, the node 21 permits an address to be accorded to the node 22. The node 22 accords the address (i) to itself and transmits data indicating that the address (i) has been accorded to itself over a bus 26. The node 21 then permits the node 23 to set its own address. The node 23 permits an address to be accorded to the node 24 connected to its port #1. The node 24 accords the address (ii) to itself. The node 23 permits an address to be accorded to a node 25 connected to its port #2. The node 25 accords an address (iii) to itself. After having accorded addresses to its slave node 24 and slave node 25, the node 23 accords an address (iv) to itself. After having accorded addresses to its slave node 22 and slave node 23, the node 21 accords an address (v) to itself.

With the present communication system, it is possible to carry out synchronous communication or continuous communication at a constant data rate and asynchronous communication for transmitting control commands, for example, non-periodically, that is whenever the necessity arises.

Figure 10:
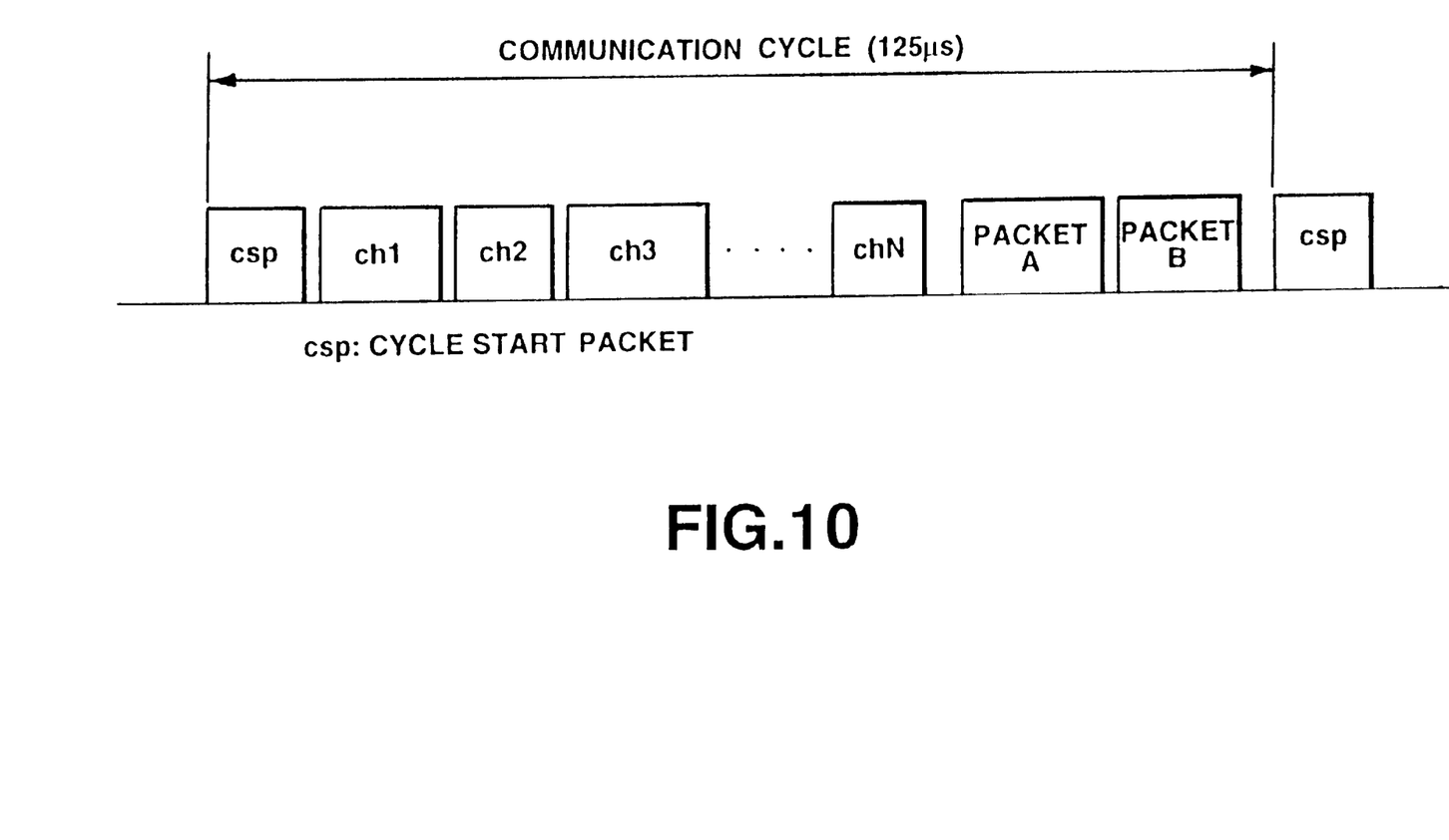
FIG. 10 shows an example of data construction on the bus in the above-mentioned communication system.

With the present communication system, communication is carried out at a communication cycle having a pre-set period, such as 125 $\mu$s, as shown in FIG. 10. The communication cycle starts with a cycle start packet csp, followed by a period for transmitting a packet for synchronous communication. By affixing channel numbers 1, 2, 3, . . . N to the respective packets for synchronous communication, plural synchronous communication cycles may be carried out. For example, if the channel 1 is allocated to the communication from the node 22 to the node 23, communication is carried out by the node 22 transmitting the packet for synchronous communication having the channel number 1 directly after the cycle start packet csp and by the node 23 monitoring the bus 26 and fetching the packet for synchronous communication having the channel number 1. Similarly, the communication from the node 24 to the node 21 can be accorded to the channel 2, while the packet of a channel can be received by plural nodes.

If plural synchronous communication cycles are carried out, it is attempted to transmit the packets for synchronous communication over plural channels directly after the cycle start packet cps. In such case, the packet of synchronous communication of a channel is first transmitted by arbitration means (such as CSMA/CD) as determined by the bus 26. The packets of synchronous communication of other channels are then transmitted sequentially.

After termination of transmission of the packets of synchronous communication of all of the channels, the time interval until the next cycle start packet csp is employed for asynchronous communication. To the packets for asynchronous communication (packets A and B in FIG. 10) are affixed addresses of the transmitting node and the receiving node. The respective nodes fetch the packets having the addresses proper to the nodes affixed thereto.

Since the details of the above-described communication system are publicized as "IEEE P1394 Serial Bus Design Statement, they are not explained herein specifically.

In order for the above-described communication system to operate correctly, it is necessary for the respective synchronous communication packets to have different channel numbers, while it is necessary for the sum total of the communication time of the synchronous communication packets of the respective channels not to exceed the period of the synchronous communication. To this end, it is necessary to check before the start of synchronous communication of a node that the communication capacity necessary for the communication is available on the bus and to have an un-used channel allocated for the communication if there is any residual communication capacity in the bus.

For supervising the communication capacity and the channel number employed for synchronous communication, it is commonplace practice that one of the nodes connected to a bus become a bus management node and to effect required management. In such case, other nodes indicate the communication capacity desired to be employed to the bus management node, using the asynchronous communication packet, and require channels to be allocated to them. The bus management node checks if the communication capacity in use added to the communication capacity newly requested does not exceed the maximum communication capacity of the bus. If the sum is not in excess of the maximum communication capacity of the bus, the bus management node notices the channel number and the effect of permission of synchronous communication. If the sum is in excess of the maximum communication capacity of the bus, the bus management node notices that the channel allocation is not permitted. After termination of the synchronous communication, the management node is notified of the channel number and the channel capacity which will not be in use.

Since the bus supervision is in need of complex processing operations, it is commonplace practice with the communication system centered about e.g., a personal computer to use the personal computer as a bus management node and to perform the processing operations using the software possessed by the personal computer. However, if this method is employed for the communication system between the AV apparatus, such as a digital VTR, tuner or a monitor, it becomes necessary to interconnect an apparatus having powerful data processing functions, such as personal computer, to the bus, in addition to the AV apparatus, thus raising the cost of the communication system.

In view of the above problem, it is an object of the present invention to provide a method for realizing facilitated management of a bus in a system for carrying out synchronous communication between plural nodes connected to the bus.

DISCLOSURE OF THE INVENTION

In accordance with this invention a method for bus management in a system for performing synchronous communication between plural nodes connected to a bus in which, among the plural nodes, a pre-set node having first storage means for storing the channel use state and for storing the bus use state is set as a bus management node, each node reads out the contents of the first and second storage means when starting the synchronous communication, and in which, if there is any vacant channel or any vacant capacity, each node writes the number of the channel started to be used and the capacity of the bus started to be used in the first and second storage means, respectively. Thus the channel number and the bus capacity may be supervised by the bus management node by simply responding to the readout command and the write command to the first and second storage means.

In a preferred embodiment each node has plural communication clocks of different frequencies. Thus it is possible for each node to carry out communication by the communication clocks of plural different frequencies so that there can exist communication of different speeds from channel to channel.

In accordance with an aspect of this invention, if the bus management node is changed during the synchronous communication, the node already engaged in the synchronous communication executes the sequence of channel acquisition within a pre-set time. In this manner, the node already engaged in the synchronous communication executes the sequence of acquiring the channel within a pres-set time, while the node newly starting the synchronous communication executes the sequence of acquiring the channel after lapse of the pre-set time.

In accordance with another aspect of this invention the node having the maximum address is set as the bus management node. Thus, if a root node is determined, it becomes the bus management node.

In a preferred feature of the present invention the bus use state stored in the second storage means has time-based values. Thus it becomes possible for the bus use state to have time-based values.

BEST MODE FOR CARRYING OUT THE INVENTION

Figure 1:
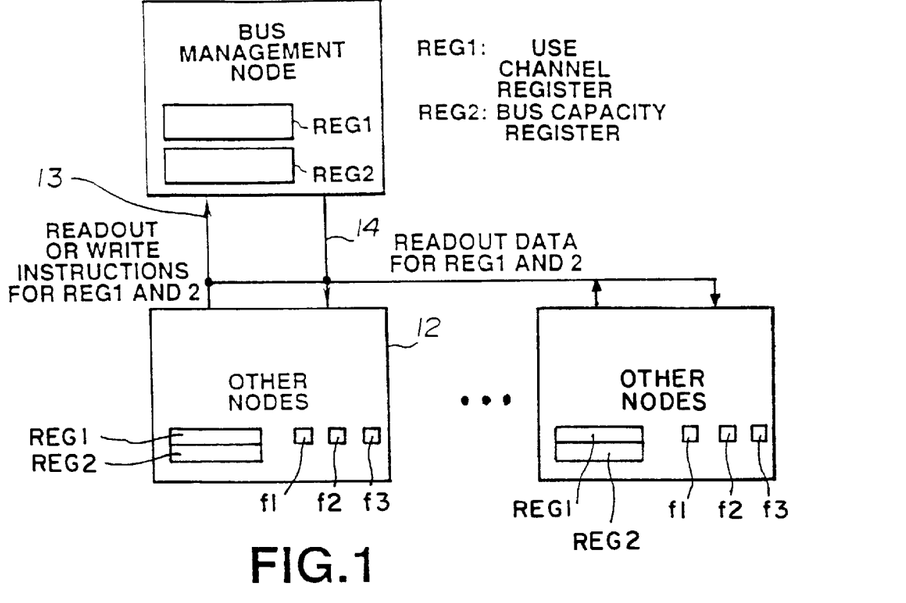
FIG. 1 is a block diagram showing a specified constitution of a communication system to which the present invention is applied.
Figure 2A:
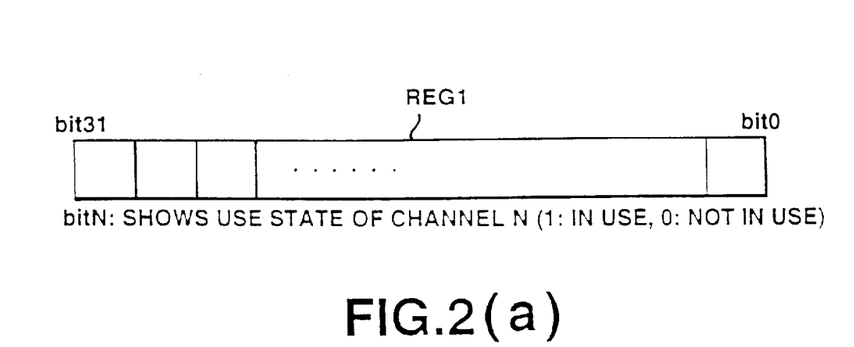
FIGS. 2A and 2B show a practical constitution of a register for channels in use and a bus capacity register of a bus management node constituting the bus capacity register, respectively.
Figure 2B:
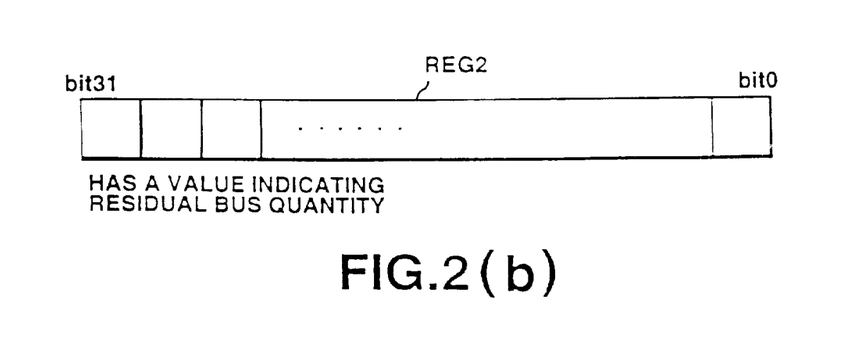

Referring to the drawings, preferred embodiments of the present invention will be explained in detail. FIG. 1 illustrates the concept of the present invention and FIGS. 2A and 2B show examples of the construction of a register for channels in use and the bus capacity register shown in FIG. 1.

Referring to FIG. 1, a bus management node 11 has the register for channels in use REG1 and the bus capacity register REG2. The register for channels in use REG1 has the capacity of e.g., 32 bits, each of the bits (bit 0 to bit 31) representing the state of use of channels 0 to 31, with 1 indicating a channel in use and 0 indicating a channel not in use. As shown in FIG. 2b, the bus capacity register REG2 has the capacity of e.g., 32 bits, thus having a value capable of indicating the residual bus capacity or the sum of the capacities in use.

Before starting the synchronous communication, another node 12 in the communication system transmits a readout command to the register for channels in use REG1 and the bus capacity register REG2 over a twist pair cable 13, using the asynchronous communication packet, and reads out the contents of the command over a twist pair cable 14 in order to confirm the number of the channel not in use and the residual capacity of the bus. If there is any channel not in use and there is any residual bus capacity, the other node 12 transmits write commands to the register for channels in use REG1 and the bus capacity register REG2 so that the number of the channel in use and the capacity of the bus in use will be written in the register for channels in use REG1 and the bus capacity register REG2. When starting the synchronous communication, the bus management node 11 issues write and readout commands to the register for channels in use REG1 and the bus capacity register REG2 therein in order to effect processing in a similar manner.

If the present invention is applied to, for example, the communication system shown in FIG. 8, the register for channels in use REG1 and the bus capacity register REG2 are provided in the respective nodes. The bus management node 11 is the node 21 as a root node. If the register for channels in use REG1 and the bus capacity register REG2 are provided in each of the respective nodes, bus management becomes possible no matter which node become the root node. Any node other than the root node may also be used as a bus management node.

Referring to FIGS. 3 to 7, preferred embodiments of the present invention will be explained in detail. In the flow charts, YES and NO in the decision steps are abbreviated to Y and N, respectively.

Figure 3:
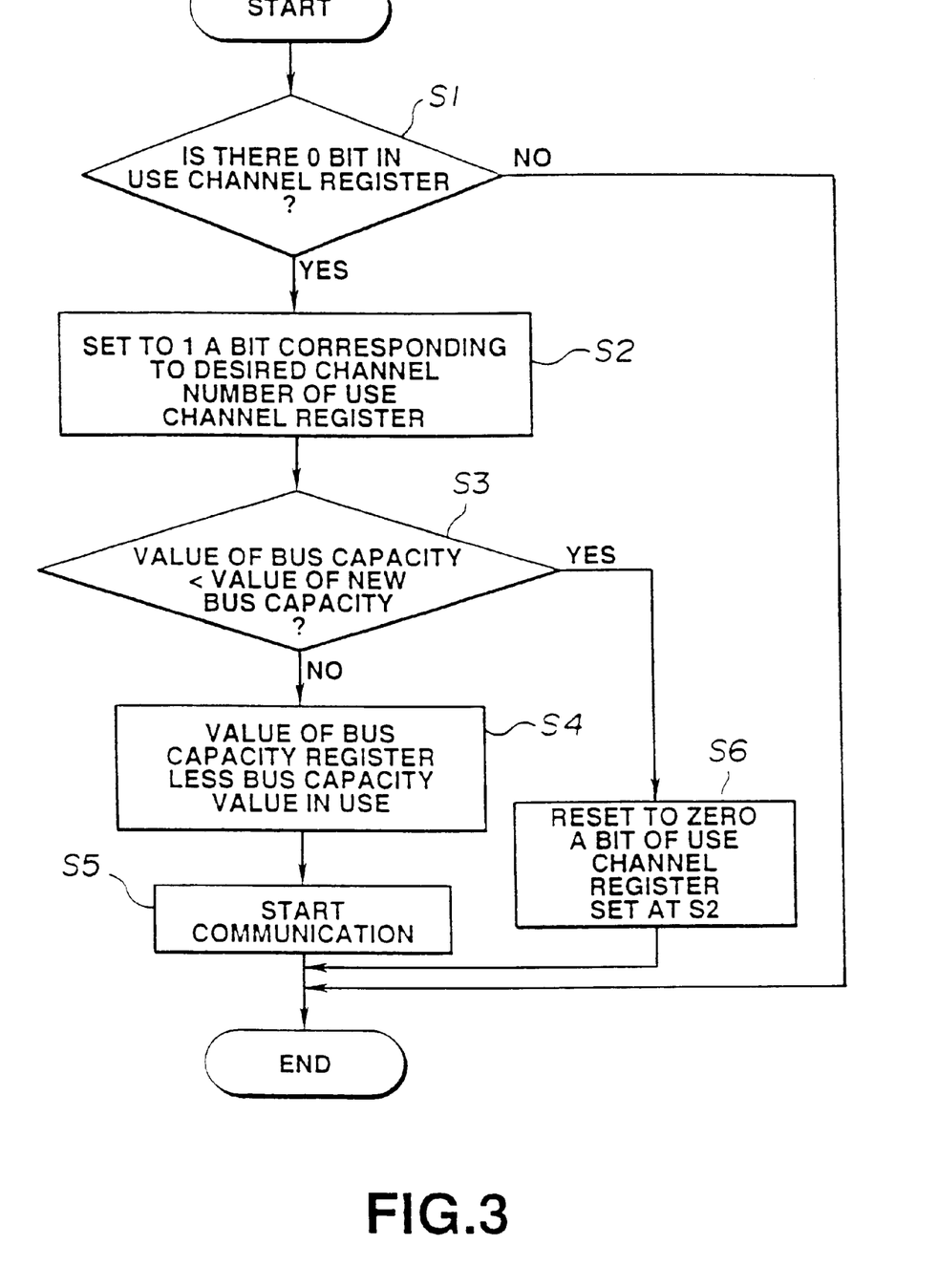
FIG. 3 is a flow chart showing a practical example of the sequence of channel acquisition before starting synchronous communication.

FIG. 3 is a flow chart showing an example of the procedure for channel acquisition before starting the synchronous communication.

Referring to FIG. 3, the node 12 effecting the synchronous communication transmits to the bus management node 11 a command for reading out the contents of the register for channels in use REG1. The contents of the register for channels in use REG1 thus read out are checked in order to give judgement if there is any bit 0. If there is no 0 bit, there is no vacant channel, so that the processing comes to a close. If there is a bit 0, the node 12 proceeds to step S2.

At step S2, the node 12 transmits to the bus management node 11 a write command for setting the bit corresponding to the channel number desired to be employed. The node 12 then proceeds to step S3.

At step S3, the node 12 transmits to the bus management node 11 a command for reading out the contents of the bus capacity register REG2, and checks the contents of the bus capacity register REG2 thus read out. The node 12 compares the value of the bus capacity register REG2, that is the residual capacity of the bus, to the value of the capacity to be newly in use. If the value of the bus capacity register REG2 is larger, synchronous communication is possible, so that the node 12 proceeds to step S4. If the value of the capacity to be newly in use is found at step S3 to be larger, synchronous communication cannot be carried out, so that the node 12 proceeds to step S6.

At step S4, the node 12 issues to the bus management node 12 a write command for setting a value equal to the value of the bus capacity register REG2 less the value of the capacity to be newly in use as a new value of the bus capacity register REG2. The node 12 then proceeds to step S5. The node 12 starts the synchronous communication at step S5.

At step S6, the node 12 transmits a write command for resetting to 0 the bit set to 1 at step S2 to the bus management node 11.

Figure 4:
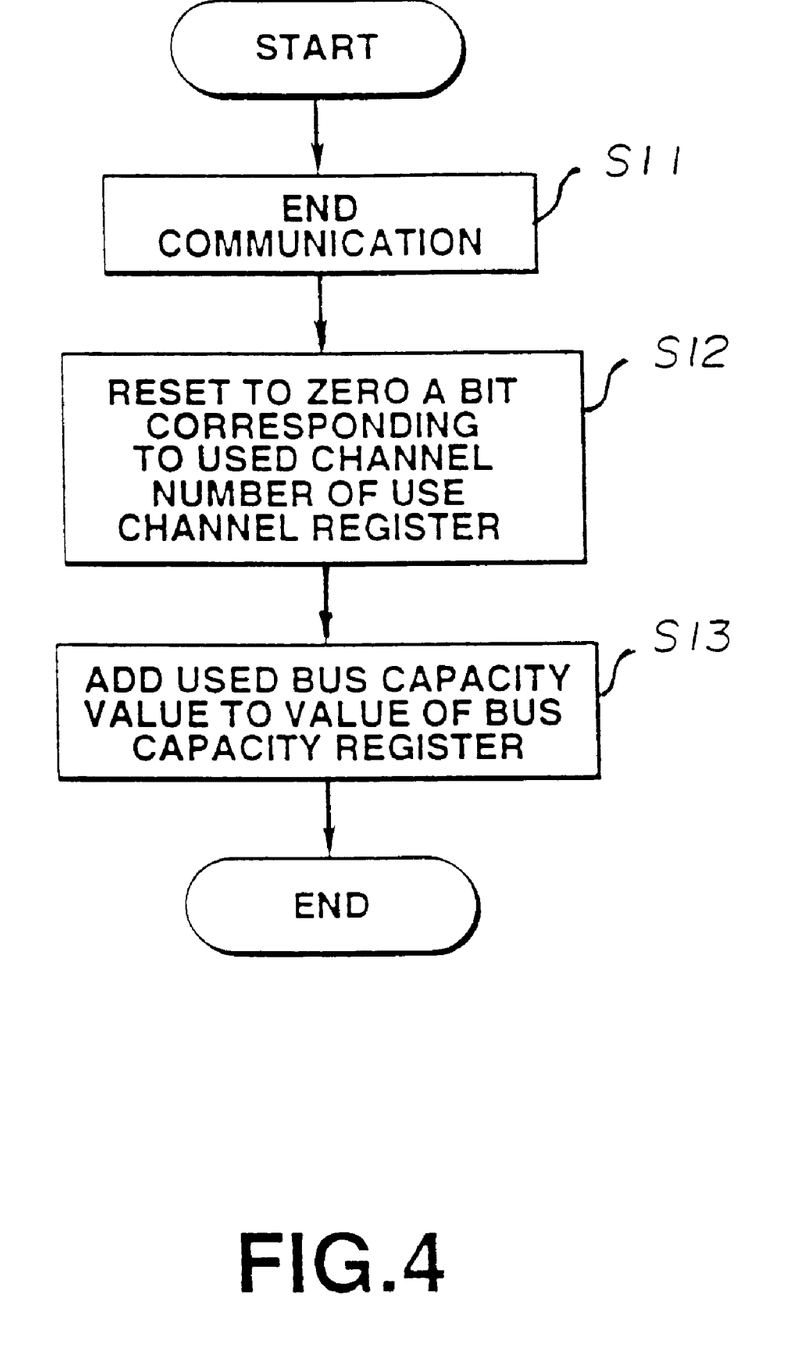
FIG. 4 is a flow chart for showing a practical example of the sequence of operations for channel restoration after termination of the synchronous communication.

FIG. 4 is a flow chart showing the sequence of operations of returning the channel after the end of the synchronous communication. In the following description, the description as to transmitting a readout command for reading the contents of the registers REG1 and REG2 and as to transmitting a write command for rewriting the register contents.

Referring to FIG. 4, if the communication comes to a close at step S11, the node 12 proceeds to step S12, where the bit corresponding to the number of the channel of the register for channels in use REG1 which has ceased to be used is reset to 0. At step S13, the node 12 adds the value of the capacity of the bus which has ceased to be used to the value of the register for channels in use REG1.

With the above-described sequence of operations, it is possible for the bus management node 11 to allocate the channels by a simplified operation of responding to the write command and the readout command. However, it may occur that, with such sequence of operations, correct processing cannot be made in the case of competition among plural nodes. The sequence of operations capable of coping with such case is explained by referring to FIGS. 5 to 7.

Figure 5:
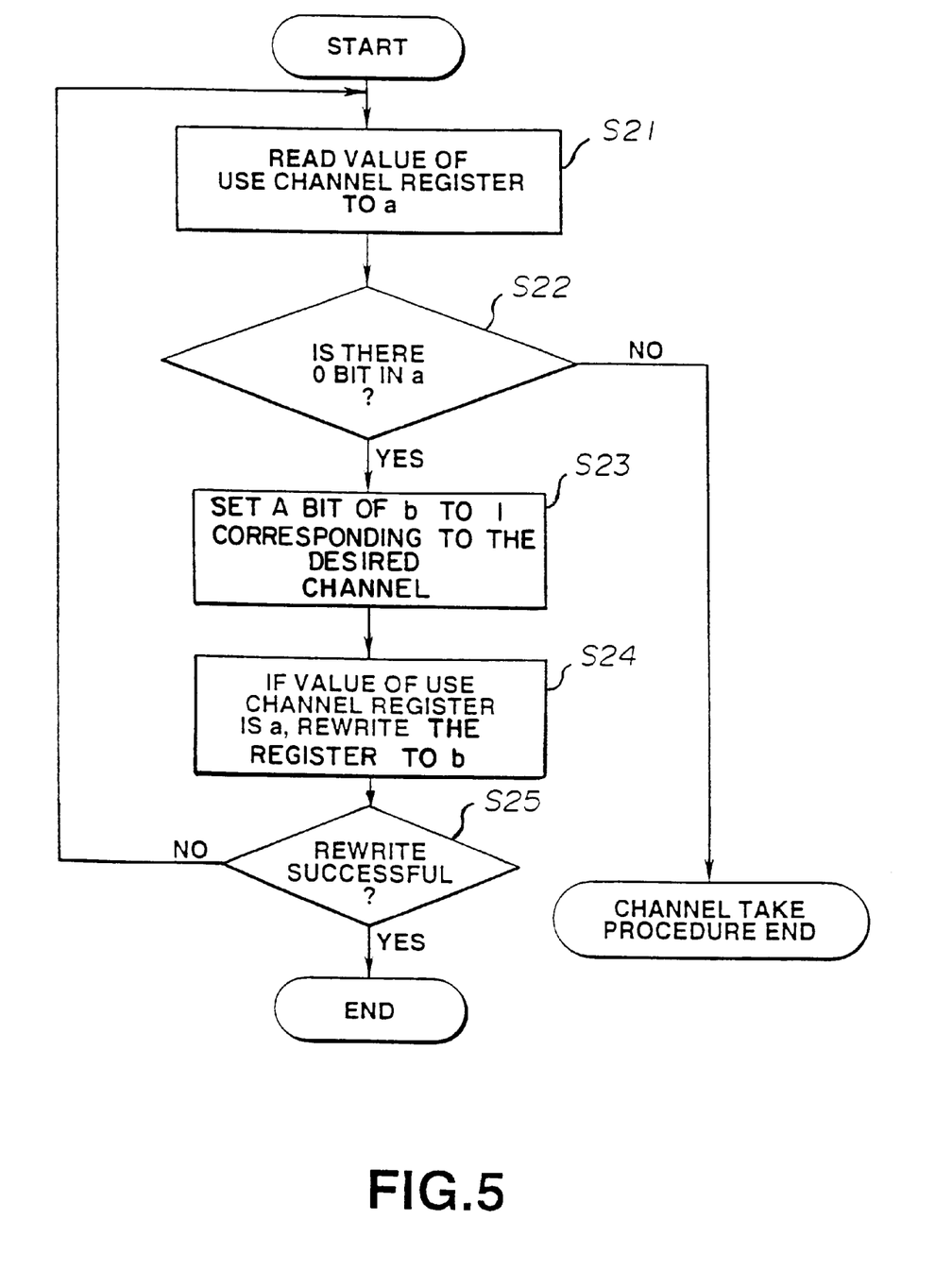
FIG. 5 is a flow chart showing the sequence of setting the bits of the register for channels in use in order to avoid competition between nodes.

FIG. 5 is a flow chart for setting the bit of the register for channels in use REG1, that is the operations corresponding to the steps S1 and S2 of FIG. 3.

At step S21, the node 12 reads the value (binary number) of the register for channels in use REG1 and sets the value to a. The node 12 then proceeds to step S22. At step S22, the node 12 judges whether or not there is a bit 0 in a. The foregoing processing is substantially the same as the step S1 of FIG. 3. If there is no bit 0 in a, the node 12 terminates the operational sequence of channel acquisition, since there is no vacant channel. If there is a bit 0 in a, the node 12 proceeds to step S23.

At step S23, the node 12 sets the value a of the register REG1 to a value b such that the bit corresponding to the channel desired to be used for synchronous communication is set to 1, before proceeding to step S24.

At step S24 the value of the register for channels in use REG1 is set to b, before proceeding to step S25. That is, the processing at step S24 is the processing provided for evading the competition with other nodes. This step S24 can be implemented by a node desiring to occupy a channel transmitting a command to the bus management node 11 for rewriting (setting) the value of the register for channels in use REG1 to b. The value of the register for channels in use REG1 being a means that another node has not set the value of the register for channels in use REG1 since the time the node 12 read at step S21 the value of the register for channels in use REG1 until step S24. Conversely, the value of the register for channels in use REG1 not being a means that an other node has set the value of the register for channels in use REG1.

At step S25, the node 12 judges whether or not the rewriting has resulted in success. If the result is YES, that is the rewriting has succeeded, the node 12 terminates the operating sequence. If otherwise, the node 12 returns to step S21. The decision as to the success/failure may be given based on the notice of the results of writing transmitted from the bus management node 11, or by reading out the value of the register for channels in use REG1 and checking whether or not it has been rewritten to b.

Figure 6:
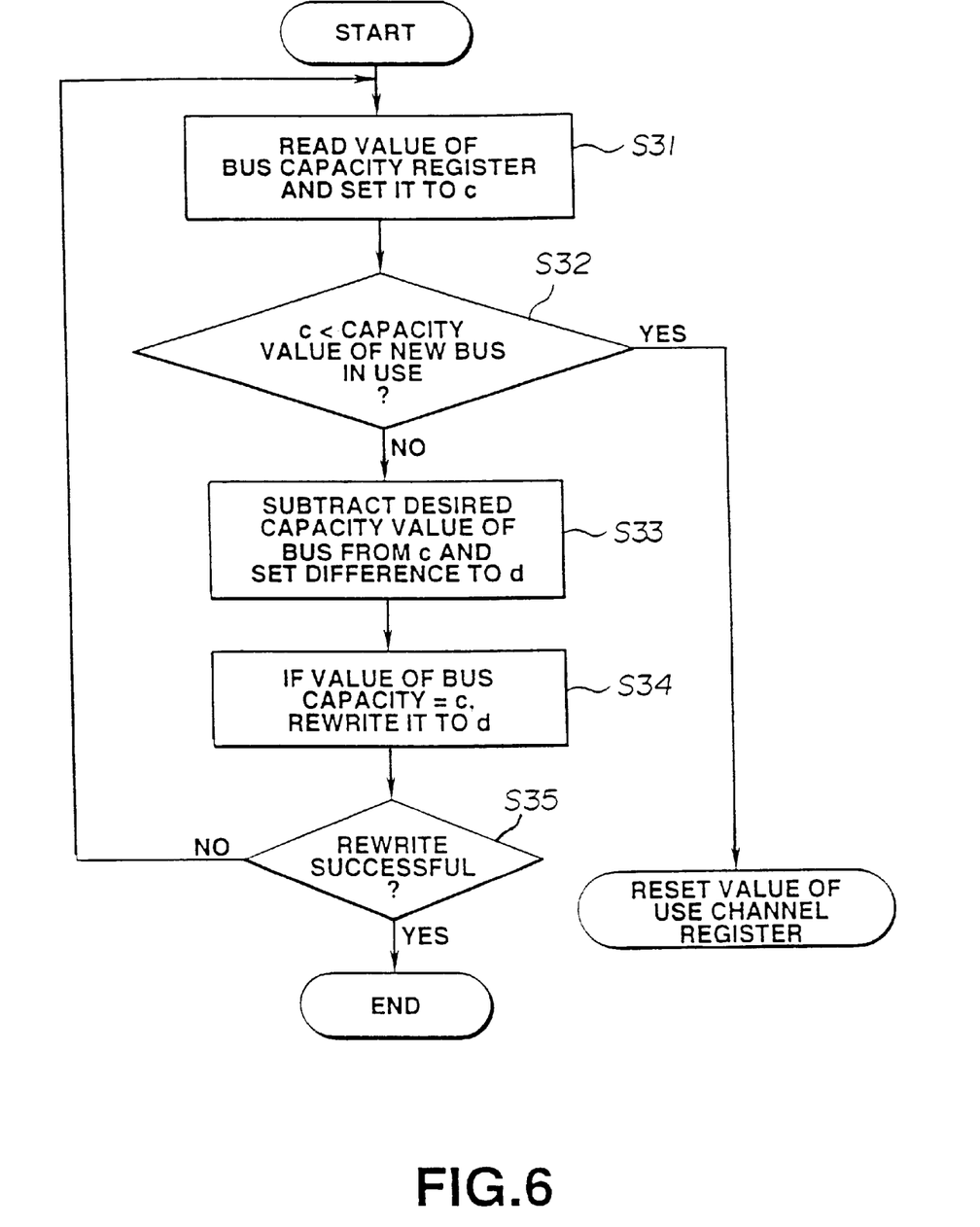
FIG. 6 is a flow chart showing the sequence of subtracting the value of the bus capacity from the value of the bus capacity register in order to avoid competition between nodes.

FIG. 6 is a flow chart showing the operating sequence of subtracting the bus capacity value from the value of the bus capacity register REG2, that is the operating sequence corresponding to the steps S3 and S4.

At step S31, the node 12 reads the value of the bus capacity register REG2 and set the value to c. The node 12 then proceeds to step S32 in which the node 12 judges which of c and the capacity value of the bus to be used newly is larger. The above processing is substantially the same as the step S3 shown in FIG. 3. If c is smaller than the capacity value of the bus to be used newly, synchronous communication cannot be carried out, so the node 12 resets the value of the register for channels in use REG1 to its original value, as at step S6 shown in FIG. 3. If c is larger than the capacity value of the bus to be used newly, synchronous communication can carried out, so the node 12 proceeds to step S33.

At step S33, the node 12 subtracts the capacity value of the bus desired to be used from c to give d before proceeding to step S34.

If at step S34 the value of the bus capacity register REG2 is c, the node 12 rewrites it to d before proceeding to step S35. That is, the step S34 is the processing for avoiding competition with other nodes. The value of the bus capacity register REG2 being c means that an other node has not rewritten the value of the bus capacity register REG2. since the time the node 12 has read out at step S31 the value of the bus capacity register REG2 until step S34. Conversely, the value of the bus capacity register REG2 not being c means that an other node has rewritten the value of the bus capacity register REG2.

At step S35, the node judges whether or not rewriting has succeeded. If the rewriting has succeeded, the node 12 terminates the processing and, if otherwise, the node 12 returns to step S31.

Figure 7:
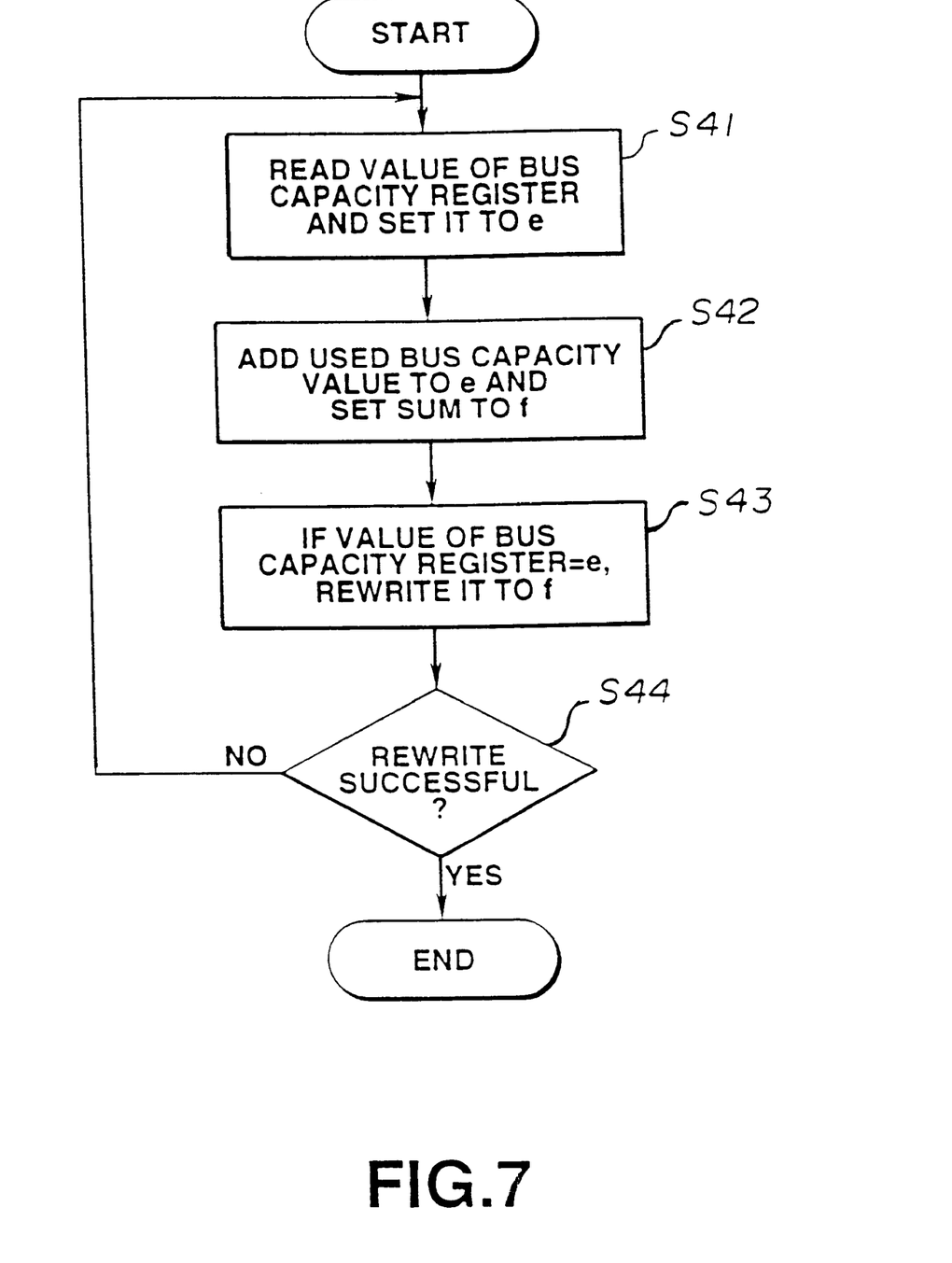
FIG. 7 is a flow chart showing the sequence of adding the value of the bus capacity to the value of the bus capacity register in order to avoid competition between nodes.

FIG. 7 is a flow chart showing the operating sequence of adding the bus capacity value to the value of the bus capacity register REG2, that is the operating sequence corresponding to the step S13 of FIG. 4.

At step S41, the node 12 reads the value of the bus capacity register REG2, and sets it to e before proceeding to step S42.

At step S42, the node adds the capacity value of the bus whose end has come to a close to e and sets the sum to f before proceeding to step S43.

If at step S43 the value of the bus capacity register REG2 is e, the node 12 rewrites it to f before proceeding to step S44.

At step S44, the node 12 judges whether or not the rewriting has succeeded. If the rewriting has succeeded, the node 12 terminates the processing and, if otherwise, the node 12 returns to step S41. Since the meaning of each processing in the sequence of operations is apparent from the explanation given in connection with FIGS. 5 and 6, the corresponding description is omitted for simplicity.

The value to be stored in the bus capacity register REG2 is now explained.

In the present embodiment, the bus capacity register REG2 stores the un-used portion of the time period in the time period of synchronous communication cycle of 125 μs that may be used for synchronous communication, as counted based on the basic clocks used for communication. Thus the register REG2 stored time-based values. If, as an example, the basic clock of communication in a bus system of 98.304 Mbps is 49.152 MHz, and 100 μs within the period of 125 μs is to be useable for synchronous communication, with the remaining 25 μs being used for transmission of the cycle start packet csp shown in FIG. 10 and for the asynchronous communication packets A and B, the maximum value of the bus capacity corresponds to 4915 basic clocks. Thus the bus capacity register REG2 is initially set to 4915 from which the number of clocks corresponding to the bus capacity value used for each channel allocation to the node 12 is subtracted.

For example, when starting the synchronous communication of 10 Mbps, data equal to 1250 bits per synchronous communication cycle is transmitted. The time consumed for transmitting the data is equal to 625 basic clocks for transmitting data per se plus the overhead time consumed for bus arbitration or the like. If the overhead is 1 μs, corresponding to 50 basic clock periods, 675 is to be subtracted from the bus capacity register REG2.

If each node in the communication system is capable of communication with the basic clocks of plural different frequencies, for example, 49.152 MHz, 2×49.152 MHz or 4×49.152 MHz, and plural synchronous communication cycles are carried out at different basic clocks, it suffices to set the value stored in the bus capacity register REG2 so as to be equal to the value counted by a selected one of the plural basic clocks.

The operation when the constitution of the communication system has been changed during the synchronous communication has been changed is explained. If, for example, the cable between the nodes 21 and 23 between the nodes 23 and 24 in the communication system shown in FIG. 8 is disconnected during the synchronous communication, there is no bus management node in the communication system including the nodes 23 and 24.

For avoiding such problem, if a node is disconnected or connected during the synchronous communication, the node with the maximum address in the new construction of the communication system is set as a new bus management node. If the bus management node is determined, the node engaged in synchronous communication executes a channel acquisition sequence with respect to the new bus management node within a pre-set time, while the node newly starting the synchronous communication executes the channel acquisition sequence after lapse of the preset present time. It is possible for the node already engaged in synchronous communication to start the synchronous communication immediately and to execute the channel acquisition sequence as a parallel operation.

By so doing, if the bus management node is changed, channel allocation is made preferentially to the node engaged in synchronous communication before such change in the bus management node. Thus the state which has prevailed before change in the bus management node may be reflected in the registers REG1 and REG2 of the new bus management node.

In the above explanation, it is assumed that all nodes in the communication system have the register for channels in use REG1 and the bus capacity register REG2. If this is not the case, the nodes having the register for channels in use REG1 and the bus capacity register REG2 are retrieved beginning from the node having the address (i) and the node found out first is set as the bus management node.

Industrial Applicability

As discussed above in detail, the present invention provides a method for bus management in a system for performing synchronous communication between plural nodes connected to a bus, wherein, among the plural nodes, a pre-set node having first storage means for storing the channel use state and for storing the bus use state is set as a bus management node, each node reading out the contents of the first and second storage means when starting the synchronous communication. If there is any vacant channel or any vacant capacity, each node writes the number of the channel and the capacity of the bus started to be used in the first and second storage means, respectively. Since it is possible for the bus management node to manage the channel number and the bus capacity by simply responding to the readout command and the write command to the first storage means and to the second storage means, the method may be implemented by a simplified hardware.

Also, the present invention provides for an arrangement in which each node has plural communication clocks of different frequencies. Since the communication cycles with different plural frequencies can be caused to co-exist from channel to channel, it becomes possible to cope with data with different transmission rates, such as video data or audio data.

Further, the present invention provides for an arrangement in which, if the bus management node is changed within the preset time during the synchronous communication, the node already engaged in the synchronous communication executes the sequence of channel acquisition within a pre-set time. Consequently, channel allocation may be made preferentially to the node engaged in the synchronous communication before the bus management node is changed.

Additionally, the present invention provides for an arrangement in which the node having the maximum address is set to the bus management node, so that the bus management node may be automatically determined when the root node is set.

Moreover, the present invention provides for an arrangement in which the bus use state stored in the second storage means has time-based values, so that bus capacity management becomes possible even if the communication cycles with different rates co-exists from channel to channel.

We claim:

1. Apparatus for managing synchronous communication between a plurality of nodes connected by a bus in a system, at least one node having storage means for storing channel state information and bus state information, said bus having a plurality of channels for synchronous communication, comprising:

means for designating said at least one node having said storage means as a bus management node, wherein said storage means of said bus management node is used for bus management;

means for reading by at least one of the remaining nodes, which acts as a transmitting node, said channel state information and said bus state information from said storage means of said bus management node to establish a synchronous communication with another node on said bus;

means for determining by said transmitting node whether said synchronous communication can be established between said transmitting node and said another node as a function of the read channel state information and said bus state information read by said transmitting node from said bus management node; and means for updating in said bus management node said channel state information and said bus state information by said transmitting node if it is determined said synchronous communication can be established.

2. The apparatus of claim 1, wherein at least two nodes have said storage means and wherein another node having said storage means is designated as a new bus management node when said bus management node is unavailable.

3. The apparatus of claim 1, wherein each node has a plurality of communication clocks of different frequencies such that communications on each channel are at different speeds.

4. The apparatus of claim 1, wherein said means for determining determines from the read channel state information an unused channel in which said synchronous communication is established.

5. The apparatus of claim 1, wherein said means for updating includes means for acquiring an unused channel of said bus by said transmitting node to establish said synchronous communication.

6. The apparatus of claim 5, wherein said means for acquiring unused channel includes:

means for reading by said transmitting node said channel state information from said storage means of said bus management node; and means for determining by said transmitting node if there is an unused channel on said bus from said channel state information; and wherein said means for updating is operable to update said channel state information to indicate that said unused channel is occupied if it is determined that there is an unused channel on said bus.

7. The apparatus of claim 6, wherein said means for updating further includes means for acquiring unused capacity of said bus by said transmitting node to establish said synchronous communication.

8. The apparatus of claim 7, wherein said means for acquiring unused capacity includes:

means for reading by said transmitting node said bus state information from said storage means of said bus management node; and means for determining from said bus state information if there is sufficient capacity on said bus to establish said synchronous communication; and wherein said means for updating is operable to update said bus state information if it is determined that there is sufficient capacity on said bus to establish said synchronous communication.

9. The apparatus of claim 7, wherein at least two nodes have said storage means and wherein another node having said storage means is designated as a new bus management node when said bus management node is unavailable; wherein said means for acquiring is operable to reacquire said unused channel and said unused capacity within a preset time by said transmitting node to recreate said channel state information and said bus state information, respectively; and further comprising means for reestablishing said synchronous communication using said storage means of said new bus management node.

10. The apparatus of claim 9, wherein a new transmitting node is inhibited from reading said storage means of said new bus management node to establish a synchronous communication within said preset time to give priority to previously established communications when said bus management node is unavailable.

11. The apparatus of claim 9, wherein the bus state information stored in the storage means of said bus management node contains time-based values.

12. Apparatus for managing synchronous communication between a plurality of nodes connected by a bus in a system, a subset of said plurality of nodes having storage means for storing bus state information, comprising:

means for designating a bus management node from said subset of nodes, wherein said storage means of said bus management node is used for bus management;

means for reading by at least one of the remaining nodes, which acts as a transmitting node, said bus state information from said storage means of said bus management node to establish a synchronous communication with another node on said bus;

means for determining by said transmitting node whether said synchronous communication can be established between said transmitting node and said other node as a function of the read bus state information read by said transmitting node from said bus management node; and means for updating in said bus management node said bus state information by said transmitting node if it is determined said synchronous communication can be established.

13. The apparatus of claim 12, wherein another node from said subset of nodes is designated as a new bus management node when said bus management node is unavailable.

14. The apparatus of claim 12, wherein said means for determining determines from the read bus state information an unused bus capacity in which said synchronous communication is established.

15. The apparatus of claim 12, wherein said means for updating includes means for acquiring unused capacity of said bus by said transmitting node to establish said synchronous communication.

16. The apparatus of claim 15, wherein said means for acquiring includes:

means for reading by said transmitting node said bus state information from said storage means of said bus management node;

means for determining from said bus state information if there is sufficient capacity on said bus to establish said synchronous communication; and means for updating said bus information state if it is determined that there is sufficient capacity on said bus to establish said synchronous communication.

17. The apparatus of claim 16, wherein another node from said subset of nodes is designated as a new bus management node when said bus management node is unavailable; wherein said means for acquiring is operable to reacquire said unused capacity of said bus within a preset time by said transmitting node to recreate said bus state information; and further comprising means for reestablishing said synchronous communication using said storage means of said new bus management node.

18. The apparatus of claim 17, wherein a new transmitting node is inhibited from reading said storage means of said new bus management node to establish a synchronous communication within said preset time to give priority to previously established communications when said bus management node is unavailable.

19. Apparatus for managing synchronous communication between a plurality of nodes connected by a bus in a system, a subset of said plurality of nodes having storage means for storing a channel state information, said bus having a plurality of channels for synchronous communication, comprising:

means for designating a bus management node from said subset of nodes, wherein said storage means of said bus management node is used for bus management;

means for reading by at least one of said plurality of nodes, which acts as a transmitting node, said channel state information from said storage means of said bus management node to establish a synchronous communication with another node on said bus;

means for determining by said transmitting node whether said synchronous communication can be established between said transmitting node and said other node as a function of the read channel state information read by said transmitting node from said bus management node; and means for updating in said bus management node said channel state information by said transmitting node if it is determined said synchronous communication can be established.

20. The apparatus of claim 19, wherein a subset of nodes is designated as a new bus management node when said bus management node is unavailable.

21. The apparatus of claim 19, wherein said means for determining determines from the read channel state information an unused channel in which said synchronous communication is established.

22. The apparatus of claim 19, wherein said means for updating includes means for acquiring an unused channel of said bus by said transmitting node to establish said synchronous communication.

23. The apparatus of claim 22, wherein said means for acquiring includes:

means for read ing by said transmitting node said channel state information from said storage means of said bus management node; and means for determining by said transmitting node if there is an unused channel on said bus from said channel state information; and wherein said means for updating is operable to update said channel state information to indicate that said unused channel is occupied if it is determined that there is an unused channel on said bus.

24. The apparatus of claim 23, wherein another node from said subset of nodes is designated as a new bus management node when said bus management node is unavailable; wherein said means for acquiring is operable to reacquire said unused channel within a preset time by said transmitting node to recreate said channel state information; and further comprising means for reestablishing said synchronous communication using said storage means of said new bus management node.

25. The apparatus of claim 24 wherein a new transmitting node is inhibited from reading said storage means of said new bus management node to establish a synchronous communication within said preset time to give priority to previously established communications when said bus management node is unavailable.

* * * * *